United States Patent [19]
DePiazzy

[11] Patent Number: 4,798,170
[45] Date of Patent: Jan. 17, 1989

[54] ANIMAL FEEDER
[76] Inventor: Edward F. DePiazzy, 1105 Mayberry Pl., Raleigh, N.C. 27609
[21] Appl. No.: 53,716
[22] Filed: May 26, 1987
[51] Int. Cl.[4] ............................................. A01K 5/01
[52] U.S. Cl. .................................................. 119/61
[58] Field of Search ............... 119/61, 52 R, 58, 18; 211/87, 88; 248/222.2, 219.1

[56] References Cited
U.S. PATENT DOCUMENTS

| | | | |
|---|---|---|---|
| 3,138,359 | 6/1964 | Stewart | 211/87 X |
| 4,308,961 | 1/1982 | Kunce | 248/222.2 X |
| 4,457,264 | 7/1984 | Maier | 119/58 |
| 4,489,837 | 12/1984 | Adair | 211/88 X |

Primary Examiner—Robert Peshock
Attorney, Agent, or Firm—Rhodes, Coats & Bennett

[57] ABSTRACT

An animal feeder includes a support frame directly attachable to the walls of an enclosure. A feed bowl is mounted on a mounting frame which mates with the support frame. A spring-biased releasing mechanism releases the feed bowl and associated mounting frame from the support frame for cleaning.

9 Claims, 3 Drawing Sheets

ANIMAL FEEDER

FIELD OF THE INVENTION

The present invention relates generally to animal husbandry and more particularly to animal feeders.

BACKGROUND OF THE INVENTION

In animal care facilities such as kennels, animal hospitals, as well as research laboratories, care must be exercised to maintain a sanitary environment for the animal in order to meet stringent animal care regulations. Floor-type feed bowls can be easily removed from an animal's enclosure and thus facilitate cleaning. However, floor-type feed bowls are easily contaminated by dirt, animal excrement, and other debris within the enclosure and must be frequently cleaned. Additionally, floor-type feed bowls are subject to overturning resulting in significant waste of food.

While some effort has been made to develop floor-type feed bowls which are not easily overturned, a more practical solution is to mount the feed bowl on the wall of the enclosure. This greatly reduces the risk of contamination by raising the bowl above the floor of the enclosure. However, a wall or cage mounted feed bowl has some drawbacks.

A cage or wall mounted feeder is not as easily cleaned due to its attachment to the walls of the enclosure. Thus, it is necessary to enter the enclosure when cleaning the animal feeder.

SUMMARY AND OBJECTS OF THE INVENTION

After much research and study into the foregoing problems the present invention was developed to provide a cage or wall mounted animal feeder which is capable of being quickly removed for sanitizing. This is accomplished by mounting a support frame to the wall of the enclosure which is designed to releasably mate with a mounting frame attached to the back of the feed bowl. Spring-biased retaining means allow the bowl to be quickly removed for sanitizing.

Accordingly, it is an object of the present invention to provide means for mounting an animal feeder on the wall of an enclosure wherein the animal is kept.

Another object of the present invention is to provide an animal feeder having a detachable feed bowl which can be removed for sanitizing.

Another object of the present invention is to provide a quick release mechanism for releasing the feed bowl from its support structure.

Still another object of the present invention is to provide a feed bowl that is sturdy in construction and which cannot be destroyed by the animal.

Other objects and advantages of the present invention will become apparent and obvious from a study of the following description and the accompanying drawings which are merely illustrative of such invention.

DETAILED DESCRIPTION OF THE INVENTION

Figure 1:
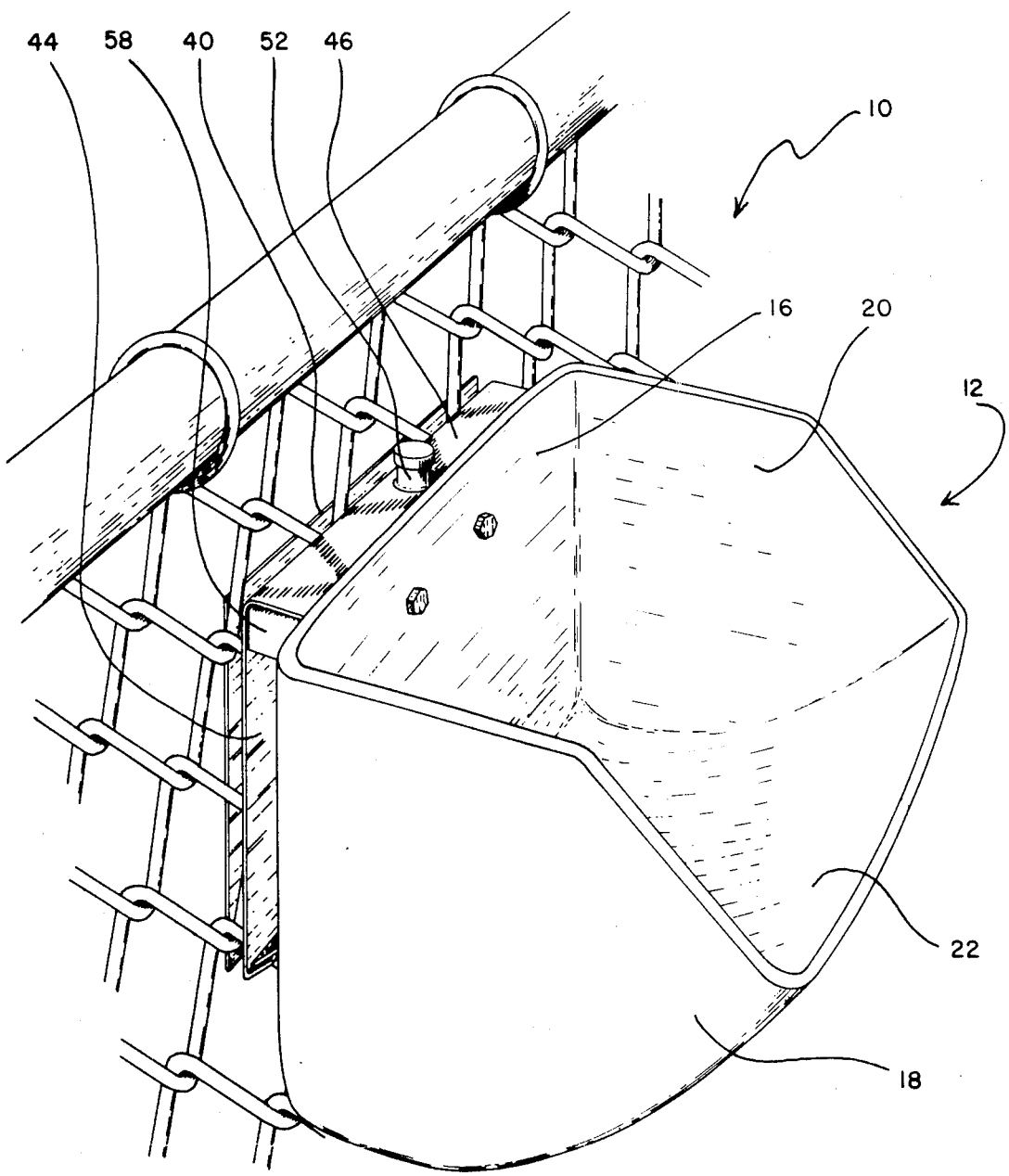
FIG. 1 is a front perspective view of the animal feeder of the present invention.
Figure 3:
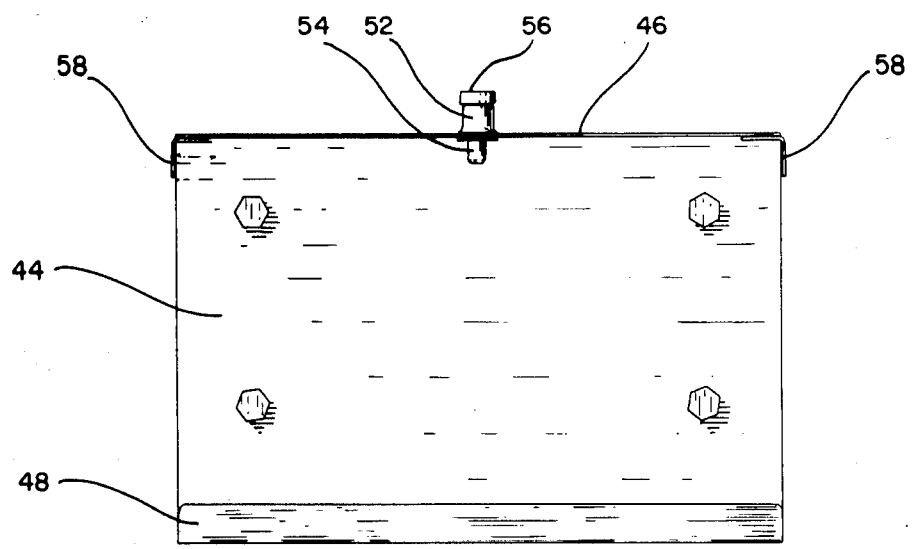
FIG. 3 is a front perspective view of the support frame thereof.

Referring now to the drawings the animal feeder of the present invention as shown therein and indicated generally by numeral 10. The animal feeder 10 includes a feed bowl indicated generally at 12 and a mounting structure indicated generally at 14.

Looking at feed bowl 12 in more detail, it is seen that the same includes a back 16, sides 18 and 20, an arcuate front portion 22 and an open top 24. The feed bowl is constructed of a USDA-FDA approved material such as injection molded high density polyethylene.

Attached to the back 16 of feed bowl 12 is a mounting frame 26 secured by means of a conventional hex bolt and nut assembly 28. The mounting frame 26 includes a back portion 30, a flange portion 32 extending along the upper edge thereof, and an angled portion 34. An opening 36 is formed in the center of flange portion 32 as can be best seen in FIG. 2.

Figure 2:
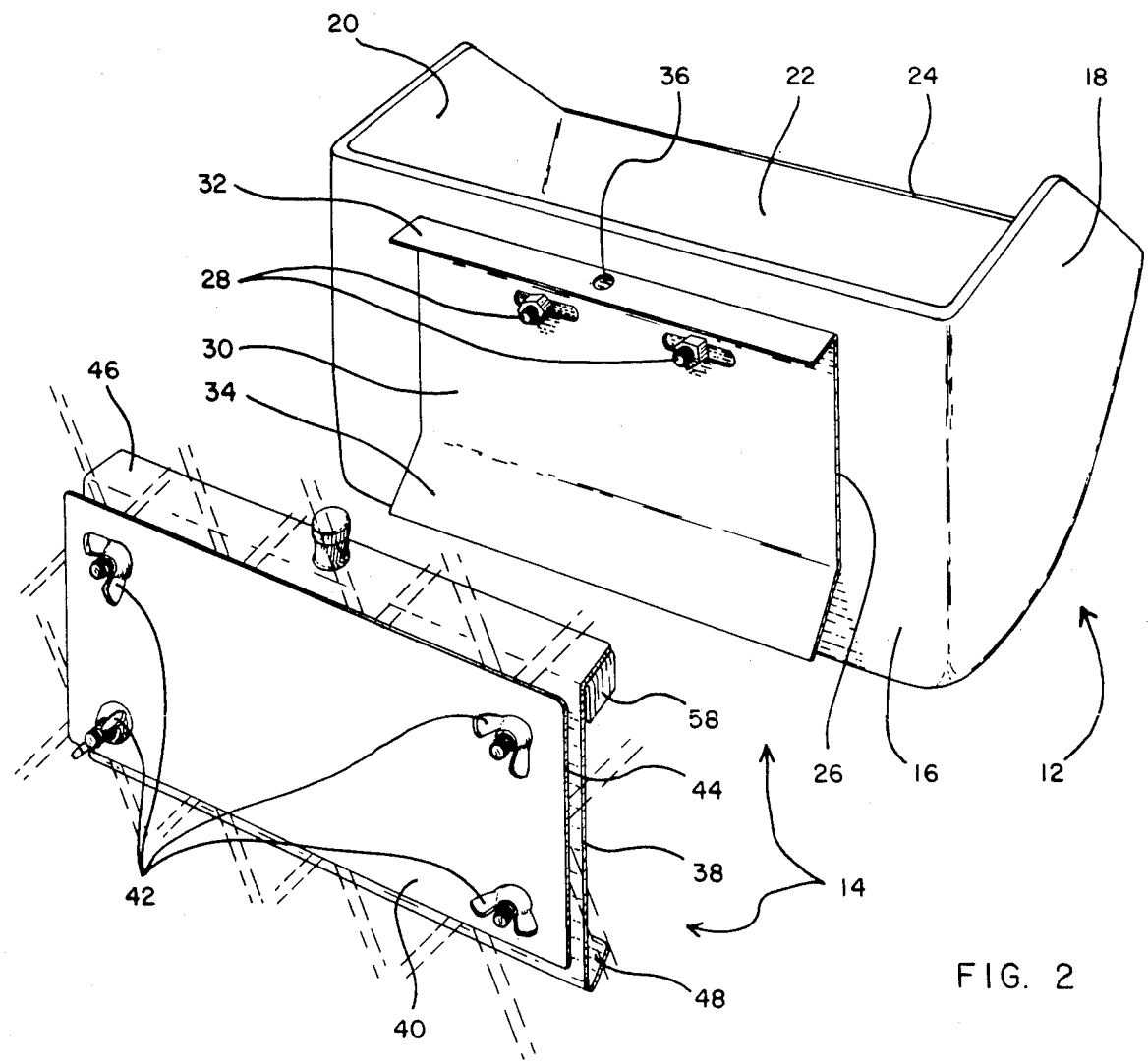
FIG. 2 is a rear perspective view thereof showing the feed bowl separated from its support frame.

The mounting frame 26 is designed to mate with a corresponding support frame 38 which is mounted directly to a wall or fence forming the enclosure. In the embodiment shown, support frame 38 is mounted on a chain link fence, which is sandwiched between support frame 38 and a support plate 40. The support frame 38 and support plate 40 are held together by four conventional hex bolts and wing nut assemblies 42 as shown in FIG. 2. Alternatively, the support frame can be fastened to a wall by suitable hardware such as wood screws, in the case of a wood wall. (FIGS. 4 & 5) Side retainer plates 58 are formed on each end of flange 46 the purpose of which will become apparent from subsequent portions of this disclosure.

Support frame 38 includes a back portion 44, a flange 46 extending along the upper edge along back portion 44, and an upturned portion 48 defining an upwardly opening channel 50. A spring-biased retaining pin 52 is mounted at the center of the flange 46 and includes a projecting member 54 which extends through flange 46. By pulling upwardly on the top 56 of the retaining pin 52, the projecting member 54 will be moved upwardly to permit the mounting frame 26 to be inserted into the support frame 38. (FIG. 4) Upon releasing the retaining pin 52 the same will turned to its usual downward position. Since spring-biased retaining pins of this type are well-known to those skilled in the art and readily commercially available, further detailed discussion of the same is not deemed necessary.

To use the animal feeder 10 of the present invention, the support frame 38 is mounted to the wall of the enclosure as hereinabove described. While the embodiment shown contemplates connection with a chain link enclosure, it is appreciated that the support frame 38 may be mounted directly to a concrete or steel wall with suitable hardware such as anchor bolts or wood screws. (See for instance, FIGS. 4 & 5)

Figure 4:
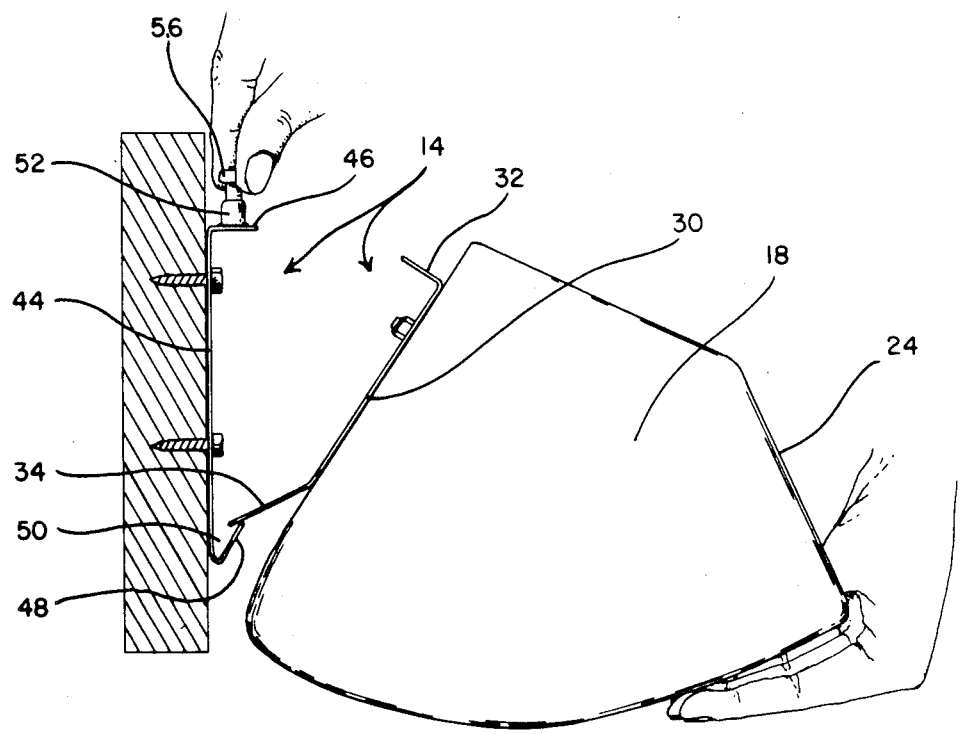
FIG. 4 is a side elevational view thereof with the feed bowl disengaged and in an inclined state.

The front portion 22 of the feed bowl 12 is grasped in one hand and tilted slightly forwardly as shown in FIG. 4. With the feed bowl 12 leaning forwardly, the edge of the angled portion 34 is inserted into the upwardly opening channel 50 formed by the upturned portion 48 of support frame 38.

Figure 5:
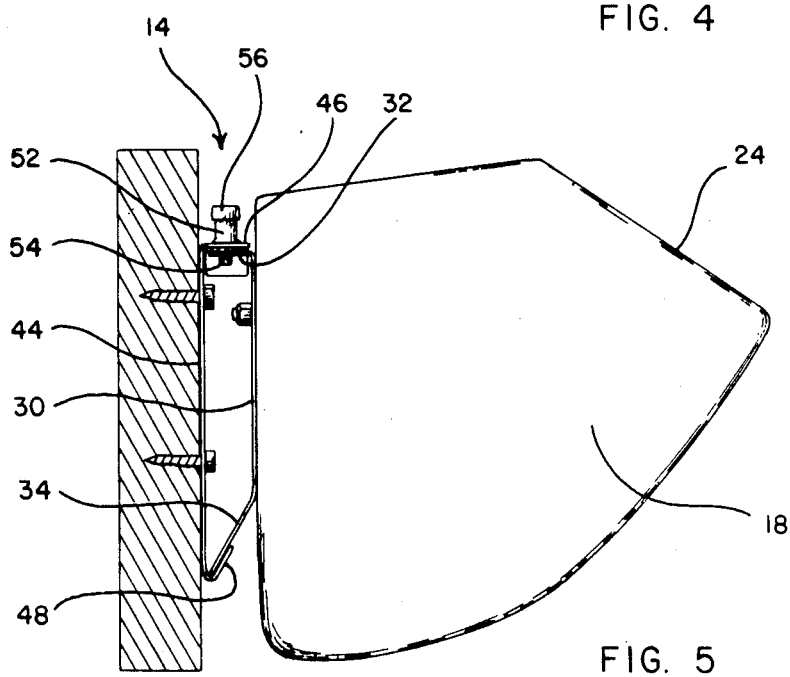
FIG. 5 is a side elevational view thereof with the feed bowl fully engaged.

With the free hand, the spring-biased retaining pin 52 is pulled upwardly while the top of the mounting frame 26 is pushed back against the back portion 44 of support frame 38 to the position shown in FIG. 5. When the retaining pin 52 is released, the projecting member 54 will be extended through the opening 36 in the center of flange portion 30 thereby securing the feed bowl to the support frame 38.

To remove the feed bowl, the retaining pin 52 is pulled upwardly and the feed bowl is leaned forwardly so as to clear the projecting member 54. The feed bowl can then be lifted from the upwardly opening channel 50 in the support frame 38 and taken to a remote location for sanitizing.

From the foregoing, it is apparent that the animal feeder of the present invention greatly facilitates the cleaning of an animal's enclosure and creates a more sanitary environment for the animal.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. An animal feeder comprising: a feed bowl; a mounting frame secured to said feed bowl and formed from a rectangular plate, the upper edge of said plate being bent along a line extending parallel to the upper edge thereof to form a perpendicular flange portion, said plate further being bent along a line extending parallel to the lower edge thereof to form an angled portion; a support frame formed from a rectangular plate for mounting on the wall of an enclosure, said support frame being bent along a line extending parallel to the upper edge thereof to form a second perpendicular flange portion, the lower edge of said support frame being turned upwardly to define an upwardly opening channel for receiving the angled portion of said mounting frame; said first flange portion being disposable adjacent said second flange portion when said angled portion of said mounting frame is inserted into said upwardly opening channel defined by said upturned portion of said support frame; and spring-biased retaining means for securing said first flange portion to said second flange portion when said angled portion of said mounting frame is inserted into the upwardly opening channel defined by the upturned portion of said support frame.

2. The animal feeder of claim 1 wherein said first flange portion includes an opening formed in the center thereof and wherein spring-biased securing means includes a spring-biased retaining pin secured to the center of said second flange portion, said retaining pin including a projecting member that extends through said opening in said first flange portion thereby securing said mounting frame to said support frame and wherein said retaining pin can be moved upwardly to withdraw said projecting member from said opening in said first flange portion to enable said mounting frame and associated feed bowl to be lifted from said support frame for sanitizing.

3. The animal feeder of claim 2 wherein said feed bowl is injection molded from a high density polyethylene.

4. An animal feeder comprising:
(a) a support frame including an upper and lower edge, a flange projecting perpendicularly from the upper edge, and an upturned portion projecting upwardly at an angle from the lower edge so as to define a horizontally extending channel;
(b) means for fixing the support frame to a vertical support surface;
(c) a mounting frame including an upper and lower edge adapted to mate with the support frame, the mounting frame including an angled portion terminating at the lower edge of the mounting frame and receivable in the channel formed along the lower edge of the support frame, and a second flange projecting perpendicularly from the upper edge of the support frame;
(d) means for locking the mounting frame to the support frame including an opening formed in one of the first and second flanges, and retaining pin secured to the other of the first and second flanges, the retaining pin being movable between a first locked position in which the pin extends through the opening and a second unlocked position in which the pin is withdrawn from the opening; and
(e) a feed bowl fixed to the mounting frame.

5. The animal feeder according to claim 1 wherein the retaining pin is biased to a locked position.

6. The animal feeder according to claim 4 adapted for use in connection with a wire fence as a vertical support surface wherein the fixing means comprises a plate disposable on one side of the wire fence opposite the support frame, and screw means extending through the wire fence for drawing the support frame and the platter together with the wire fence sandwiched therebetween.

7. An animal feeder comprising:
(a) a support frame having an upper and lower edge, and an upwardly opening channel formed along the lower edge;
(b) a mounting frame having an upper and lower edge with the lower edge received in the upwardly opening channel of the support frame;
(c) means disposed along the upper edges of the support frame and mounting frame for releasably locking the mounting frame to the support frame; and
(d) a feed bowl fixed to the mounting frame.

8. The animal feeder according to claim 7 wherein the releasable locking means includes a locking member movable between a first locked position and a second unlocked position, the locking member being biased to a locked position.

9. The animal feeder according to claim 8 wherein the locking member is a spring-biased retaining pin mounted to said mounting frame and including a projecting portion which extends through an aperture formed in the support frame.